(12) United States Patent
Siegel et al.

(10) Patent No.: US 7,092,003 B1
(45) Date of Patent: Aug. 15, 2006

(54) 3-D IMAGING ARRANGEMENTS

(76) Inventors: Mel Siegel, 5232 Westminister Pl., Pittsburgh, PA (US) 15232; Yoshikazu Tobinaga, 20-8, Seifu-cho, Ohtsu-shi, Shiga-ken, 520-0225 (JP)

( * ) Notice: Subject to any disclaimer, the term of this patent is extended or adjusted under 35 U.S.C. 154(b) by 0 days.

(21) Appl. No.: 09/489,440

(22) Filed: Jan. 21, 2000

Related U.S. Application Data

(60) Provisional application No. 60/116,691, filed on Jan. 21, 1999.

(51) Int. Cl.
  *H04N 13/00* (2006.01)
  *H04N 15/00* (2006.01)
  *H04N 1/04* (2006.01)
  *H04N 13/02* (2006.01)

(52) U.S. Cl. .................................................. 348/47

(58) Field of Classification Search ............... 348/43, 348/44, 45, 46, 47, 48, 49; H04N 13/00, H04N 15/00, 1/04, 13/02
See application file for complete search history.

(56) References Cited

U.S. PATENT DOCUMENTS

| | | | |
|---|---|---|---|
| 4,734,756 A | * | 3/1988 | Butterfield et al. ............ 348/43 |
| 5,225,861 A | | 7/1993 | Marks ............................. 353/7 |
| 5,726,800 A | | 3/1998 | Ezra et al. .................... 359/466 |
| 5,808,792 A | | 9/1998 | Woodgate et al. ........... 359/463 |

OTHER PUBLICATIONS

Schwarz, A., "3-D Displays for Visual Illusion Without Visual Aid", Cyberzine 97, http://www.vrclub.at/cybzin/3dengl.htm.
Halle, M., "Autostereoscopic Displays and Computer Graphics," *Computer Graphics*, ACM SIGGRAPH, 31(2), May 1997, pp. 58-62.
Iwasaki, et al., Surmised State of Accommodation to Stereoscopic Three-Dimensional Images With Binocular Disparity, 1996, Ergonomics, vol. 39, No. 11, 1268-1272.
Nagata, S., The Binocular Fusion of Human Vision on Stereoscopic Displays—Field of View and Environment Effects, 1996, Ergonomics, vol. 39, No. 11, 1273-1284.

* cited by examiner

*Primary Examiner*—Nhon Diep
(74) *Attorney, Agent, or Firm*—Reed Smith LLP

(57) ABSTRACT

A viewing system and method for producing at least one image for being perceived as three-dimensional, including at least one of: a provision for compensating the center-of-interest of the at least one image in such a manner as to reduce convergence-accommodation conflict; a provision for configuring the viewing system such that crosstalk produced by a stereo display is perceived as foreground and background blur instead of ghosting; and a provision for viewing the at least one image via automicrostereopsis.

26 Claims, 4 Drawing Sheets

3-D IMAGING ARRANGEMENTS

CROSS-REFERENCE TO RELATED U.S. APPLICATIONS

This application claims priority from U.S. Provisional Patent Application Ser. No. 60/116,691, filed on Jan. 21, 1999.

FIELD OF THE INVENTION

The present invention generally relates to arrangements for three-dimensional imaging.

BACKGROUND OF THE INVENTION

Generally, a need has been recognized for what may be termed "kinder gentler stereo".

In this context, "stereo" refers to a system for putting information on a two-dimensional, essentially flat screen surface (such as front and back projection "movie" screens, CRTs, LCDs, etc.) in a way that causes the observer to see an image in depth corresponding to the depth in the original scene. The scene could be a real scene captured by an appropriate camera system, a virtual scene generated by a computer, or a hybrid of these.

The term "kinder gentler" is provided as a contrast to what has been experienced with known conventional devices. Particularly, conventional stereo displays often involve various types of physical and mental discomfort, to varying degrees. One commonly encountered example of such discomfort is "virtual reality sickness". Technical inconveniences have also been noted among known devices, such as specialized types of eyewear that must be worn and "viewing zones" that are often perceived to be bothersome.

At a basic level of the musculature of the human visual system, there is a well-known conflict, known as convergence-accommodation (sometimes termed "vergence-accommodation", among other things) that makes it difficult to achieve the desired consistency among stimuli (or cues). That is, because the information is presented on a 2D "flat" screen surface, the eyes focus (i.e., accommodate) on that surface. However, the directions-of-gaze of the eyes have been found to converge not on the screen but onto a center-of-interest which generally exists someplace in front of or behind the screen at a distance corresponding to the virtual location of the point or region at the momentary center-of-interest.

The conflict between what the convergence muscles and the focusing muscles are each communicating to the brain about the scene's depth is thus a major disturbing conflict. A need has thus been recognized to overcome this and other conflicts of less severe nature.

SUMMARY OF THE INVENTION

As a significant departure from known devices, at least one presently preferred embodiment of the present invention involves a stereo display system, with corresponding scene capture or scene generating components, that is natural and undisturbing to view, that involves neither eyewear nor viewing zones, and does not induce the perceptual conflicts that underlie "virtual reality sickness" and other bothersome features of existing stereo displays.

These features are achieved, in accordance with at least one embodiment of the invention, by recognizing and incorporating in the image capture or image generation system, and in the display technology, a consistent set of the numerous stimuli that contribute to depth perception.

The aforementioned conflict between what the convergence muscles and the focusing muscles are each communicating to the brain about the scene's depth is believed to be overcome in connection with at least one presently preferred embodiment of the present invention.

In accordance with at least one presently preferred embodiment of the present invention, "center-of-interest correction" (or, alternatively, "center-of-interest compensation") is contemplated. This may be carried out by optical or algorithmic means, or by a combination of the two. The left-right perspective disparity is adjusted to be zero (or near zero) at the center-of-interest.

Since the center-of-interest is generally subjective, it will typically be selected by a person. However, the present invention also broadly contemplates the possibility of selecting the center-of-interest by automatic means.

The selection of center-of-interest can preferably be accomplished by sliding the left-right perspective images over each other until they coincide at the center-of-interest. The images can then be suitably cropped so that the two fields-of-view coincide at the distance of the center-of-interest. Alternatively, the camera sensors (CCD's) could be shifted at the time of image capture. This would avoid the need to crop, such that picture area would not be lost, nor would the desirable constancy of aspect ratio be compromised.

In accordance with at least one presently preferred embodiment of the present invention, it is also recognized that it is possible to significantly decrease the disparities (corresponding to interocular separations between the real or virtual cameras generating the left and right eye views) needed to sufficiently stimulate binocular depth perception. The degree to which this is possible has been found to be quite surprising. Assuming, for mechanical convenience (as is often the case), that a human scale is employed for artificial cameras, then the standard of normal human interocular separation employed in that connection can be in the range of 60 to 65 mm. In this context, it has been found, in conjunction with at least one presently preferred embodiment of the present invention, that a 2 mm camera separation by comparison is usually completely sufficient, and even 1 mm is often adequate. This effect is to be termed "microstereopsis". A proportionately scaled interocular reduction can, of course, also be enjoyed in connection with systems that are not originally built on the aforementioned human scale.

It has been found that the combination of center-of-interest correction and microstereopsis greatly minimizes the convergence-accommodation conflict. When consistently combined with other depth cues, this combination effectively achieves the desirable consequence, encountered in accordance with at least one embodiment of the present invention, that the viewer sees the scene in depth without experiencing the undesirable side effects (e.g., "virtual reality sickness") that are normally regarded as a necessary accompaniment of 3D-stereoscopic displays.

In accordance with at least one presently preferred embodiment of the present invention, it is also recognized that the combination of center-of-interest correction and microstereopsis has the desirable side effect of enabling an entirely new class of stereoscopic display hardware paradigms, in view of a surprisingly effective utilization of "crosstalk" in accordance with at least one presently preferred embodiment of the present invention.

BRIEF DESCRIPTION OF THE DRAWINGS

The present invention and its presently preferred embodiments will be better understood by way of reference to the detailed disclosure herebelow and the accompanying drawings, wherein.

DESCRIPTION OF THE PREFERRED EMBODIMENTS

Figure 1:
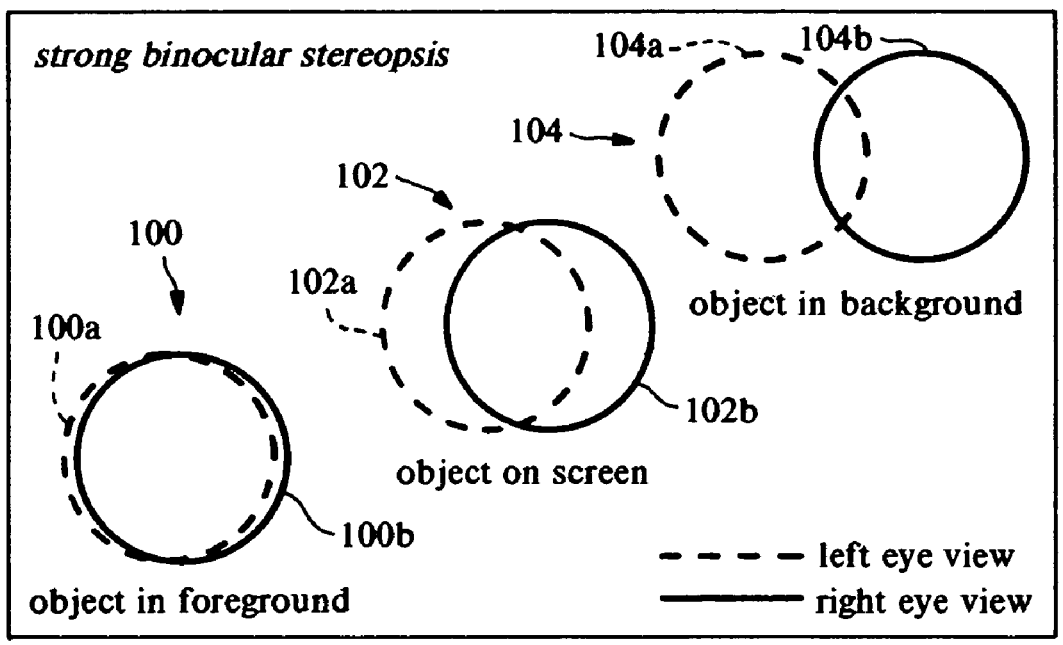
FIG. 1 is a schematic representation of the relative locations on the screen of FIG. 1a at which are rendered right eye views and left eye views of objects at background distance, screen distance, and foreground distance from the viewer for the case of a conventional three-dimensional display.
Figure 1A:
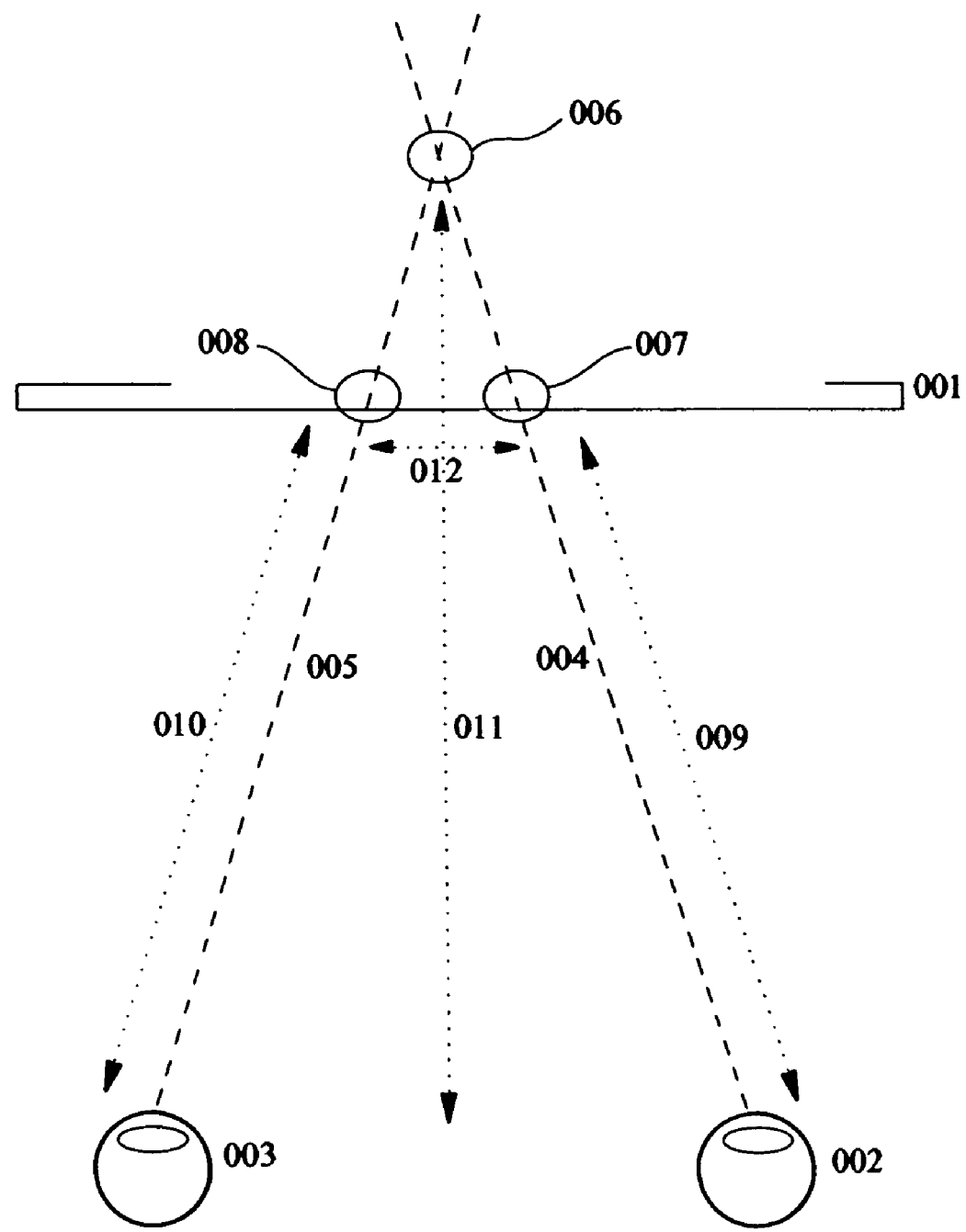
FIG. 1a is a schematic representation of right and left human eyes showing their locations and viewing directions in relation to a flat display screen on which is rendered imagery that is perceived in three-dimensions by the human brain.

Three-dimensional imagery can be displayed a flat screen 001 with the arrangement illustrated in FIG. 1a. As shown, right eye 002 and left eye 003, respectively, perceive screen points 007 and 008 along respective lines of sight 009 and 010. Shutter, barrier, or other means not illustrated explicitly in FIG. 0 are employed to prevent right eye 002 from perceiving screen point 007 intended for left eye 003, and to prevent left eye 003 from perceiving screen point 008 intended for right eye 002. Lines of sight 009 from right eye 002 and 010 from left eye 003 converge at virtual scene point 006 behind screen 001. The human brain fuses separate right eye 002 and left eye 003 perceptions of screen points 007 and 008 into a single three-dimensional perception at virtual scene point 006. The distance 012 between corresponding screen points 007 and 008 is called the "disparity".

Conventional 3D displays use large on screen disparities, as illustrated in FIG. 1. As shown, the left eye and right eye views (100a and 100b, respectively) of an object 100 in the foreground coincide to a greater degree than the left eye and right eye views (102a and 102b, respectively) of an object 102 on the screen, and greater still than the left eye and right eye views (104a and 104b, respectively) of an object 104 in the background.

It can thus be appreciated that, with the conventional arrangement shown in FIG. 1, conflict between focusing the eyes on the screen and converging the eyes on the foreground or background results in eye strain, fatigue and "virtual reality sickness". The image looks "ghosted" (doubled) if it is viewed without special equipment that would otherwise direct the left eye's view to only the left eye and the right eye's view to only the right eye.

Figure 2:
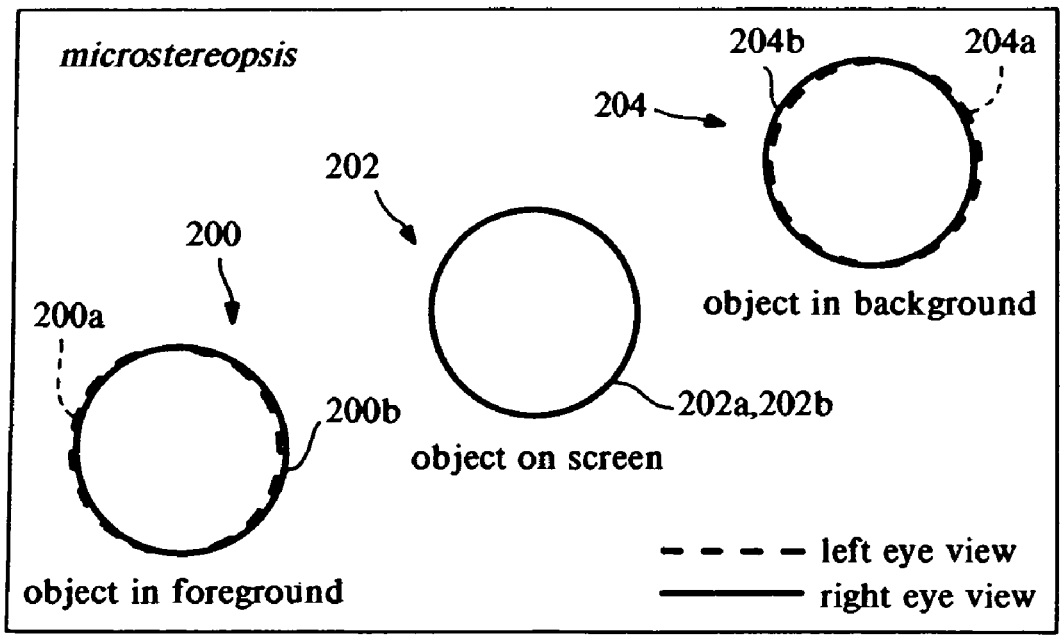
FIG. 2 is a schematic representation of the relative locations on the screen of FIG. 1a at which are rendered right eye views and left eye views of objects at background distance, screen distance, and foreground distance from the viewer for the case of a three-dimensional display utilizing "microstereopsis"

In contrast, the inventive concept of microstereopsis contemplates the use of an appropriately configured and of appropriately conducted processing to make the background and foreground disparities very small, and the on-screen disparity zero, as shown in FIG. 2. Particularly, FIG. 2 illustrates that the left eye and right eye views (200a and 200b, respectively) of an object 200 in the foreground almost completely coincide, as do the left eye and right eye views (204a and 204b, respectively) of an object 204 in the background, while the left eye and right eye views (202a and 202b, respectively) of an object 202 on the screen coincide virtually completely.

In accordance with the arrangement illustrated in FIG. 2, there is no discomfort with stereo viewing, and no ghosting with normal viewing. Perception with microstereopsis is soft and natural, like the perception of depth in the natural world. As in the natural world, depth perception with microstereopsis is enhanced by cues that complement binocular perspective disparity: mainly occlusion, shading and size familiarity with statically displayed images, and aided by motion parallax, interposition, and possible dynamic monocular depth perception (MDP) effect when the displayed image does not have to be constant in time, e.g., in video or movie images as opposed to still images.

Figure 3:
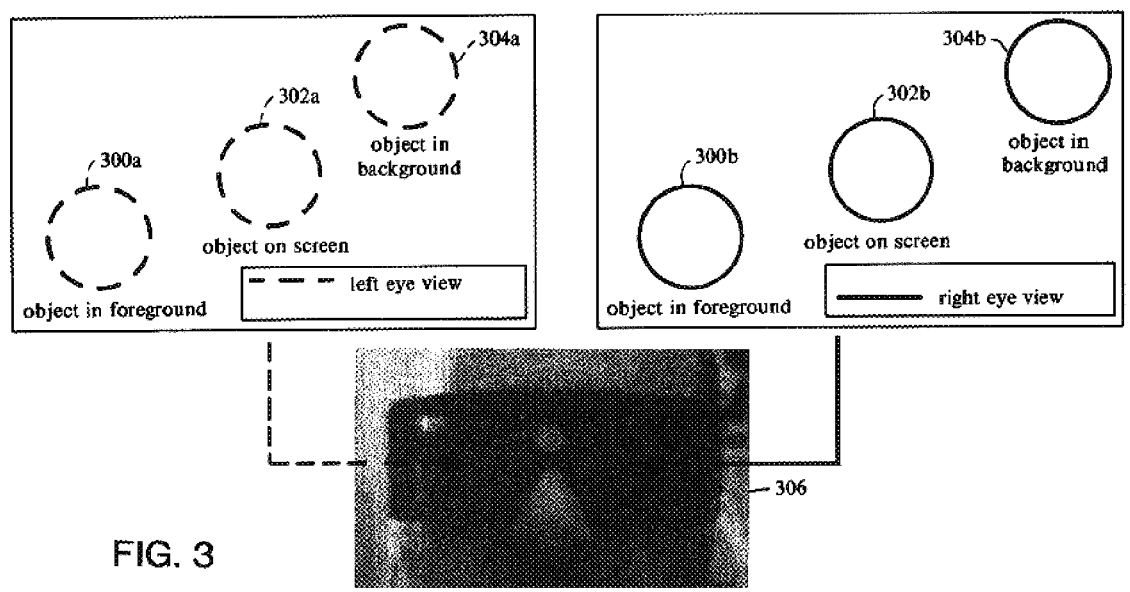
FIG. 3 is a schematic demonstration of microstereopsis.

Microstereopsis can be demonstrated using the type of off-the-shelf display equipment that is used to view left/right image pairs with strong binocular disparity, as shown in FIG. 3. Particularly, right eye views 300b, 302b and 304b, corresponding to an object in the foreground, an object on the screen and an object in the background, respectively, combine with corresponding left eye views 300a, 302a and 304a (foreground, screen and background, respectively), to result in the type of imaging shown in diagram 306.

There exist many arrangements, such as the one shown in FIG. 3, that can involve the use of some type of eyewear to select the left and right images at the left and right eyes. Although lenticular (tiny lens array) autostereoscopic (requiring no glasses) displays and the like (e.g. barrier-type displays) exist, they have inconvenient viewing zones and they reduce the horizontal resolution of the images.

Because the left and right microstereopsis images are almost identical, with microstereopsis it may be less important to completely select the left and right images at the left and right eyes than it is with strong binocular stereopsis; in other words, crosstalk between the left and right eye information channels, which is a serious defect for strong binocular stereopsis displays, may not be a significant worry with microstereopsis.

To expound on this point, crosstalk, in a stereo display, is the mixing of some information intended for the left-eye into the right-eye's view, and vice versa. The perceptual effect of crosstalk in conventional 3D-stereoscopic display systems is "ghosting", a perceived image doubling due to each eye receiving some of the other eye's image, whereas a complete separation of these information streams is ultimately desired.

A requirement to eliminate ghosting, and thus to eliminate crosstalk, can severely restrict one's options in developing a stereo display. However, it has been recognized, with relation to at least one presently preferred embodiment of the present invention, that when center-of-interest correction is applied to microstereoptically captured or generated images, that is, when left-right on-screen image disparities are very small, crosstalk does exist, but is not perceived as the highly objectionable phenomenon of ghosting. Instead, the crosstalk will be perceived as the natural and acceptable phenomena of foreground and background blurring, almost identical with the blurring associated with the finite depth of field of camera lenses and human eye lenses.

Thus, at least one presently preferred embodiment of the present invention broadly contemplates 3D-stereoscopic display systems based on principles, and employing parameters, such that any crosstalk between left and right eye channels is perceived as foreground and background blur (comparable to the blur expected from lens depth-of-focus) rather than as ghosting.

When crosstalk is perceived as foreground and background blur (which is generally perceived as not being objectionable), in contrast with its perception as ghosting (which is generally perceived as being objectionable), this essentially enables an enormous new class of display system paradigms in which the left and right eye channels do not need to be completely separated. In other words, it would essentially be sufficient for some bias to exist, so that the right eye sees more right- than left-eye image, and vice versa for the left eye.

Figure 4:
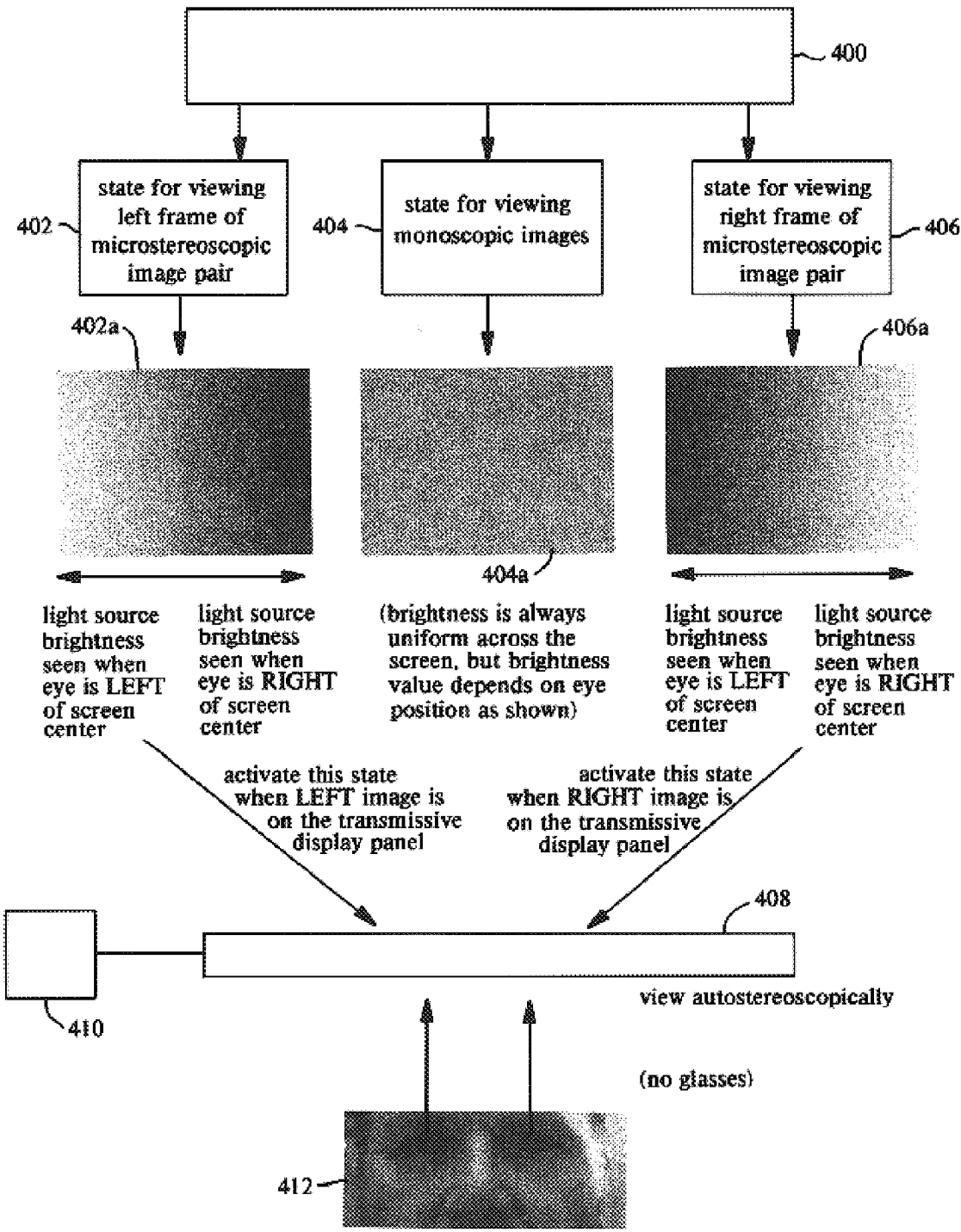
FIG. 4 is a schematic representation of an autostereoscopic arrangement utilizing microstereopsis.

With this in mind, the auto-microstereoscopic display depicted schematically in FIG. 4 is broadly contemplated in accordance with at least one presently preferred embodiment of the present invention.

As illustrated in FIG. 4, in accordance with a preferred embodiment of the present invention, a three-state electronically switched non-lambertian light source 400 may be provided. This could be embodied by a liquid crystal directional display or equivalent apparatus.

Three states will preferably be attainable by way of light source 400, namely: state 402, which is for viewing the left frame of a microstereoscopic image pair; state 404, for viewing monoscopic images; and state 406, for viewing the right frame of a microstereoscopic image pair.

As illustrated in the diagram 402a, state 402 involves greater light source brightness when the eye is left of the screen center and less light source brightness when the eye is right of the screen center. In contrast, as shown in diagram 406a, state 406 involves greater light source brightness when the eye is right of the screen center and less light source brightness when the eye is left of the screen center. In either case, it is preferably the case that the transition from the brighter to the less bright zones is gradual.

As opposed to the aforementioned "left" and "right" states 402 and 406, the selectable monoscopic state 404 will preferably involve brightness that is always uniform across the screen (diagram 404a).

In accordance with an embodiment of the invention, a transmissive display panel 408 is preferably provided in which a toggling arrangement 410 serves to toggle between the left and right images provided by the light source, that is, between state 402 and state 406. The rapidity of the toggling will preferably be governed by that which is appropriate for ensuring that the aggregate image (contributed to by the left and right images) is perceived as a 3-D image without the assistance of special eyewear. A conceivable rendering of such an aggregate image is indicated in FIG. 4 at 412.

The toggle rate will preferably be comparable to that encountered in current "strong stereo" time-multiplexed systems, e.g., greater than 60 Hz per eye (30 Hz overall) and preferably close to 120 Hz per eye (60 Hz overall).

It should be appreciated that, in accordance with the embodiment illustrated in FIG. 4, the light source 400 will preferably function in such a manner that, from essentially any viewing angle, the illumination appears constant over the full area of the light source whereby, however, the intensity of the illumination depends on the viewing angle. Thus, the right eye would see the right eye image (406a) more brightly than it sees the left eye image (402a), and the left eye would see the left eye image (402a) more brightly than it sees the right eye image (406a).

In recapitulation, one example of an embodiment of the present invention that could be implemented using existing liquid crystal display (LCD) technology, is a "non-lambertian angularly coded screen" (NLAC). A conceivable substitute for the LCD display is suspended particle display technology, or perhaps even reverse emulsion display technology. The NLAC embodiment involves a light source (behind the normally pixelated image display panel), or a filtering screen (in front of the display panel), that exhibits an electrically switchable angular nonuniformity such that, from any position, it looks brighter to the right eye than to the left eye during times when the right eye image is on the pixelated display, and it looks brighter to the left eye than to the right eye during times when the left eye image is on the pixelated display. If the right and left eye images, and the corresponding biases of the NLAC, are alternated rapidly, then depth should be perceived by any observer in any location from which the display is visible. This is in contrast to the situation with existing lenticular autostereoscopic displays (i.e., in which no eyewear needed), in which correct stereoscopy is achieved for observers in certain "sweet spot" zones, left-right reversed stereoscopy (or pseudoscopy) occurs for observers in other zones, and ghosting is seen by observers in still other zones.

An analogous, simulated, example carried out in experimentation involved a conventional LCD shutter eyewear-based 3D-stereoscopic display whose electronics were modified to make it function adjustably "imperfectly", that is, so that there was (characteristically undesirable) crosstalk between the left and right eye images. The eyewear was adjusted so that crosstalk was perceived and stereoscopy was lost with a conventional stereoscopic image pair on the screen. This image pair was then be replaced by a center-of-interest adjusted microstereoptical image which, without further adjustment of the eyewear control, was perceived stereoscopically.

Thus, to achieve an autostereoscopic realization (i.e., no eyewear is involved), at least one presently preferred embodiment of the present invention contemplates an NLAC screen. A "static" analog might be the "privacy screen" material manufactured by 3M, commonly used to prevent bystanders from reading over a customer's shoulder at ATMs (automatic teller machines). The "privacy screens" available off the shelf are usually center-biased, but types are available with off-center bias, so that, for instance, a co-worker to one's right could read what is on one's computer monitor, but a customer to one's left sees only a black screen. In accordance with at least one embodiment of the present invention, it is contemplated that the property just described be electronically switchable between left and right bias.

At least one presently preferred embodiment of the present invention broadly contemplates, in addition to NLAC screens in general, any plausible principles that could be used to implement NLAC screens. Possibilities include (as mentioned) LCDs, suspended particle displays, and reverse emulsion displays. Other possibilities, to name just a few, include micromechanical "venetian blinds", micro-mirror displays (as in the projectors manufactured by Texas Instruments), holographic optical elements, and coherently emitting displays in which diffraction and interference effects can be exploited in any conceivable way.

In experimentation, it was found that, in attaining microstereopsis, frames offset by camera shifts of only a few millimeters (down to 1 mm) can be viewed binocularly using the same viewing apparatus that is normally used with frame pairs whose perspectives are offset for 50–100 mm (normally 65 mm, the typical human interocular separation). The effect was a strong perception of depth with none of the sense of discomfort that usually accompanies binocular viewing of stereo pairs.

It was found that a practical bonus of microstereopsis is that the disparity between left and right eye images is so small that no doubling is visible when the display screen is viewed without the eyewear needed to see the stereo. That is, when the screen is viewed without glasses it looks like a normal 2D-display; when it is viewed with glasses it is seen in 3D-stereo, without conflict or discomfort.

If not otherwise stated herein, it may be assumed that all components and or processes described herein may, if appropriate be considered to be interchangeable with similar components and/or processes disclosed elsewhere herein, unless an express indication is made to the contrary.

If not otherwise stated herein, any and all patents, patent publications, articles and other printed publications discussed or mentioned herein are hereby incorporated by reference as if set forth in their entirety herein.

What is claimed is:

1. A viewing system comprising an arrangement for producing, via microstereopsis, at least one image that is perceived as three dimensional, wherein camera or virtual camera interocular separation, without being scaled for human interocular separation, is substantially less than about 60 mm.

2. The viewing system according to claim 1, wherein said arrangement comprises a pair of real cameras for producing the at least one three dimensional image.

3. The viewing system according to claim 1, wherein said arrangement comprises a pair of virtual cameras for producing the at least one three-dimensional image.

4. The viewing system according to claim 1, whereby the camera or virtual camera interocular separation is about 2 mm or less.

5. The viewing system according to claim 1, further comprising means for compensating the center-of-interest as to reduce convergence-accommodation conflict.

6. A method of producing at least one image of a scene for being perceived autostereoscopically as three-dimensional, said method comprising the step of compensating the center-of-interest of the at least one image to cause the residual on-screen disparity in a foreground image and in a background image of the scene to be perceived, in the presence of crosstalk between left-eye and right-eye component images of said at least one image, as blurred and not ghosted.

7. The method according to claim 6, further comprising the step of reducing camera or virtual camera interocular separation.

8. The method according to claim 7, whereby said reducing of camera or virtual camera interocular separation results in an interocular separation of substantially less than about 60 mm.

9. The method according to claim 7, whereby said reducing of camera or virtual camera interocular separation results in an interocular separation of about 2 mm or less.

10. A method of producing at least one image for being perceived as three dimensional, said method comprising the steps of:
providing a viewing system that includes a stereo display; and
configuring the viewing system such that crosstalk produced by the stereo display is perceived as foreground and background blur instead of ghosting.

11. The method according to claim 10, wherein said stereo display comprises a suspended particle display.

12. The method according to claim 10, wherein said stereo display comprises a reverse emulsion display.

13. The method according to claim 10, wherein said stereo display comprises an LCD display.

14. The method according to claim 10, wherein said stereo display comprises a holographic display.

15. The method according to claim 10, wherein said stereo display comprises a micromirror display.

16. Method for rendering a visually comfortable three-dimensional image, said method comprising the steps of:
providing an arrangement for producing at least one perceptible image; and
providing an arrangement for viewing the at least one image via microstereopsis.

17. The method according to claim 16, further comprising the step of compensating the image center-of interest prior to viewing.

18. The method according to claim 16, whereby crosstalk produced by the image producing display is perceived as foreground and background blur instead of ghosting.

19. The method according to claim 16, wherein:
at least two images are produced by said image producing arrangement; and
said method comprises periodic switching between said at least two images that is sufficiently rapid to produce a perceptible three-dimensional image without flicker.

20. The method accordingly to claim 16, wherein said image-producing arrangement is adapted to be switched selectively to a static monoscopic state.

21. The method according to claim 16, further comprising periodic switching between a left-image dynamic stereo state and a right-image state dynamic stereo state that is sufficiently rapid as to produce a perceptible three-dimensional image.

22. The apparatus according to claim 21, further comprising an arrangement for periodically switching between a left-image dynamic stereo state and a right-image dynamic stereo state sufficiently rapidly as to produce a perceptible three-dimensional image without flicker.

23. Apparatus for rendering a visually comfortable three-dimensional image, said apparatus comprising:
an arrangement for producing at least one perceptible image; and
an arrangement for viewing the at least one image via microstereopsis.

24. The apparatus according to claim 23, whereby crosstalk produced by the image producing display is perceived as foreground and background blur instead of ghosting.

25. The apparatus according to claim 23, wherein:
said image producing arrangement is adapted to produce at least two images; and
said apparatus further comprises an arrangement for periodically switching between said at least two images as to produce a perceptible three-dimensional image without flicker.

26. The apparatus according to claim 23, wherein said image-producing arrangement is adapted to be switched selectively to a static monoscopic state.

* * * * *